United States Patent [19]
Takamatsu et al.

[11] 4,335,937
[45] Jun. 22, 1982

[54] ELECTRODE ASSEMBLY OF A LIQUID CRYSTAL DISPLAY

[75] Inventors: Toshiaki Takamatsu, Nara; Keiichiro Shimizu, Yamatokoriyama; Tomio Wada; Keisaku Nonomura, both of Nara, all of Japan

[73] Assignee: Sharp Kabushiki Kaisha, Tokyo, Japan

[21] Appl. No.: 955,333

[22] Filed: Oct. 27, 1978

[30] Foreign Application Priority Data

Nov. 11, 1977 [JP]  Japan .......................... 52-151132[U]

[51] Int. Cl.$^3$ ............................................ G02F 1/133
[52] U.S. Cl. .................... 350/336; 350/335; 340/784
[58] Field of Search ................. 350/335, 336; 340/784

[56] References Cited

U.S. PATENT DOCUMENTS

| | | | |
|---|---|---|---|
| 3,936,816 | 2/1976 | Murata | 350/336 X |
| 4,036,550 | 7/1977 | Yih | 350/336 X |
| 4,153,344 | 5/1979 | Hamada et al. | 350/336 X |

*Primary Examiner*—Edward S. Bauer
*Attorney, Agent, or Firm*—Birch, Stewart, Kolasch & Birch

[57] ABSTRACT

Within a matrix display type liquid crystal display having a first family of electrodes aligned in one direction at least the viewing side of which is made of transparent conducting material, a second family of electrodes aligned in a different direction crossed with said one direction, and a liquid crystal material between the both families of the electrodes, a respective one of the electrodes of at least one family of said both electrode families is made up of a picture element electrode and a wiring electrode for connecting the picture element electrodes and an extension electrode connected to the wiring electrode and an electrode width at a portion thereof other than a picture element area wider than the picture element are for the purpose of reducing the resistance of the wiring electrode.

2 Claims, 3 Drawing Figures

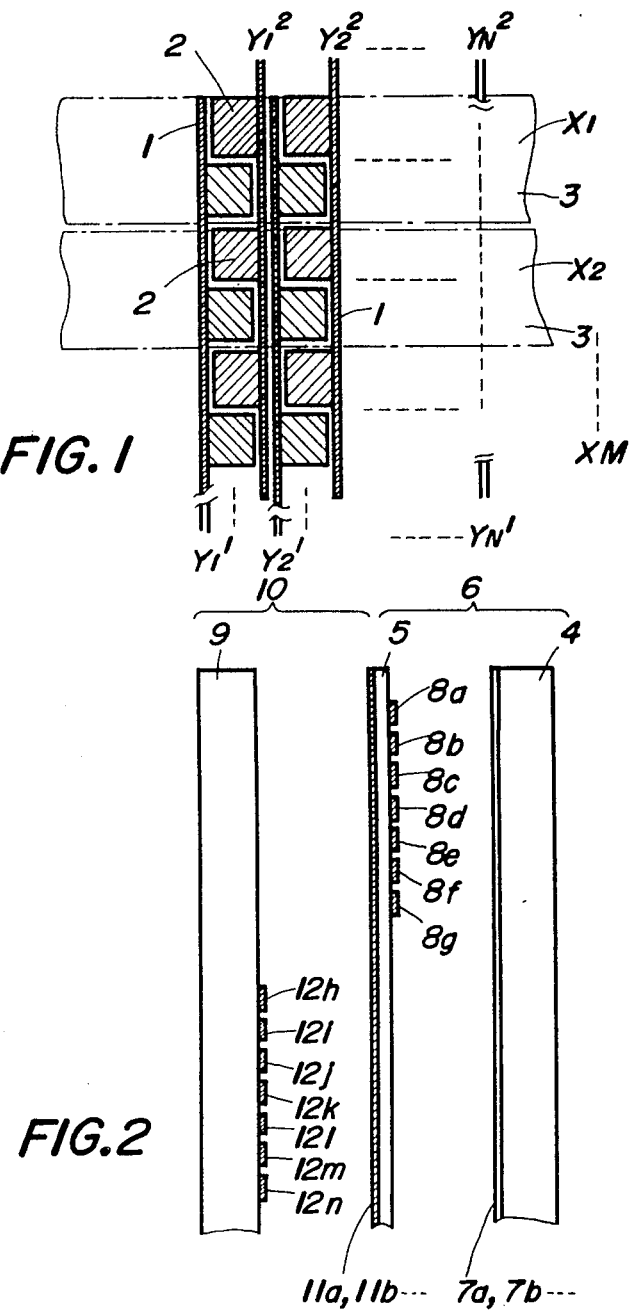

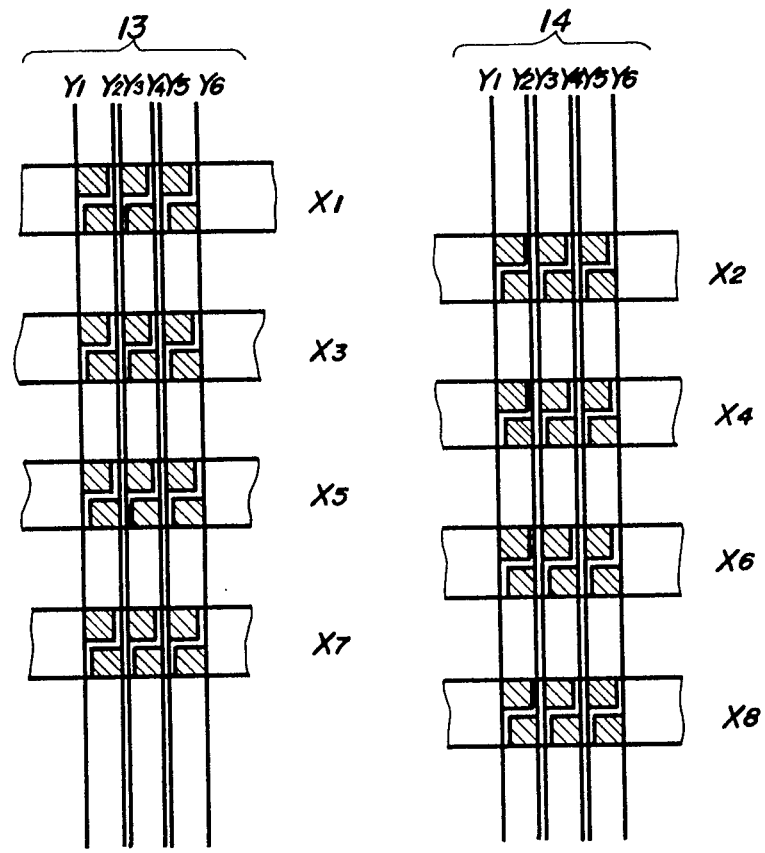
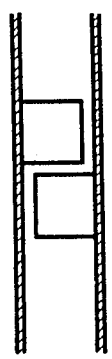
FIG. 3A
FIG. 3B

ELECTRODE ASSEMBLY OF A LIQUID CRYSTAL DISPLAY

BACKGROUND OF THE INVENTION

The present invention relates to a matrix electrode assembly of a liquid crystal display panel and more particularly to an improvement in the matrix electrode assembly.

As a rule, a matrix display is of the type where orthogonal strip electrodes are disposed and the portion thereof where the electrodes cross forms a picture element thereby providing a visual display of characters, symbols, numerals, patterns or the like in response to selective application of a voltage to the respective X and Y electrodes. The most common problem with the matrix type display is that a voltage may be applied to some extent, to a crossing of X and Y electrodes which are not desired to operate (termed "non-selected point") while applying a more than threshold voltage to a crossing of X and Y electrodes which are desired to operate (termed "selected point"). This causes the crosstalk phenomenon.

Actually in driving address-by-address a matrix type display which takes advantage of electro-optical effects of a liquid crystal such as the twisted nematic field effects (TN), the dynamic scattering effects (DSM), the field induced double refraction effects (TB) and the guest host effects (GH), the crosstalk phenomenon often places non-selected points into an operating state, resulting in difficulties in displaying desired patterns. This is because the electro-optical effects of liquid crystal have electrically bidirectional features and sometimes shows no definite threshold effects. A well known resolution to this problem is the voltage amplitude selection method. Typically, an X electrode and a Y electrode are supplied with voltages $V_o$ and O when selected and with voltages $\frac{1}{3} V_o$ and $\frac{2}{3} V_o$ when not selected, respectively. As a result, each selected point of the X and Y electrode is supplied with a voltage O and each non-selected point with a voltage $\frac{1}{3} V_o$. This is termed the 1:3 voltage average method. In this instance a ratio of effective voltage on the selected point to that on the non-selected point can be represented below:

$$\frac{V_s \text{ (effective voltage on selected point)}}{V_u \text{ (effective voltage on non-selected point)}} = \sqrt{\frac{8}{N} + 1} \quad (1)$$

wherein n is the so-called degree of multiplexing and thus corresponds to the number of scanning electrodes in the XY matrix panel.

Analysis of the formula (1) reveals that the ratio of $V_s/V_u$ is reduced with an increase in the number N of the scanning electrodes. $V_u$ is generally selected below a threshold voltage ($V_{th}$) of the electro-optical effects of liquid crystal and $V_s$ above the threshold voltage.

To provide a high quality display of an image on the liquid crystal display, it is necessary to increase the number of displaying electrodes and enhance resolution of an image. However, with an increase in the number of the electrodes and thus in the number of scanning lines, the latter results in a reduction in the effective value of applied voltage and a limited range of a viewing angle particularly on a twisted nematic field effect mode liquid crystal display (TN-FEM-LCD) or other problems in employing the voltage amplitude selection drive method. It is, therefore, impossible to increase the number of the scanning lines of the liquid crystal display over a given limit.

Another way to enhance resolution of a matrix display without reducing the effective value of an applied voltage is to improve both an electrode layout and a cell structure instead. The applicant of this application has developed an improved electrode structure of a liquid crystal display, which is a combination of a double electrode structure and a two layer cell structure as best seen from FIG. 3(A). See our copending application Ser. No. 921,062 filed June 30, 1978. As shown in FIG. 1, the double electrode structure consists of not only a predetermined number of strip electrodes but also a predetermined number of wiring electrodes connected to every alternate electrode together in a same plane.

In other words, the wiring electrodes 1 such as Al, Au, Cr, Ni, etc., are arranged together in an array of square electrodes 2 which may be made of either transparent conducting material such as $In_2O_3$ and $SnO_2$ or reflective conducting material such as Al, Au, Cr, Ni, etc. Those square electrodes 2 are arrayed in contact, alternatively, with Y axis electrodes $Y_1 1$ and $Y_1 2$, which constitute a one Y axis electrode $Y_1$. Other Y axis electrodes are formed in the same way. An X axis electrode 3, on the other hand, is a conventional strip electrode as denoted by the phantom line and may be made of $In_2O_3$ or $SnO_2$.

The cell structure of FIG. 2 is adapted such that all line electrodes necessary for a single display pattern are closely disposed as a group and are disposed alternatively on a front cell or a rear cell without display dots overlapped with one another within the same display pattern area. See our copending application Ser. No. 450,782 filed on Oct. 12, 1978 entitled MATRIX ELECTRODE STRUCTURE IN A MULTILAYER MATRIX TYPE LIQUID CRYSTAL DISPLAY. The front cell 6 is comprised of a front glass support 4 carrying column electrodes $7a$, $7b$, . . . and an intermediate glass support 5 carrying line electrodes $8a$, $8b$, . . . . For example, when a display pattern is in the form of a $5 \times 7$ matrix, seven line electrodes $8a$–$8g$ are disposed continuously as a group on the front surface of the intermediate glass support 5. The rear cell 10 is composed of the intermediate glass support 5 and a rear glass support 9, the intermediate glass support 5 carrying on its rear surface column electrodes $11a$, $11b$, . . . which are brought into line with the column electordes $7a$, $7b$. Line electrodes $12h$, $12i$, . . . , for example, seven line elctrodes $12h$–$12n$, are disposed as a group on the rear support 9. In this way, each group of the line electrodes is disposed alternatively on the front cell 6 and the rear cell 10.

As noted earlier, the liquid crystal display structure of FIG. 3(A) is a combination of the ones of FIGS. 1 and 2. A first layer cell 13 provides a display by picture element electrodes $Y_1, Y_2, \ldots Y_6$ and strip electrodes $X_1, X_3, X_5, X_7$, whereas a second layer cell 14 provides a display by picture element electrodes $Y_1, Y_2, \ldots Y_6$ and strip electrodes $X_2, X_4, X_6, X_8$.

FIG. 3(B) is an enlarged representation showing a basic pattern of the picture element electrodes. It is clear from FIG. 3(B) that the picture element is extremely slender at a portion other than an area corresponding to a displaying picture element. Therefore, employment of the transparent conducting material such as $In_2O_3$ and $SnO_2$ leads to a extremely high resistance so that a sufficient and desirable voltage would not be applied to the selected picture element electrodes.

It is therefore an object of the present invention to reduce the resistance of a picture element electrode of a matrix type liquid crystal display panel. According to the present invention, the electrode width of the picture element electrode is selected to be as wide as possible at a portion thereof other than a display area the select ion being made to the extent that a display performance will not be affected. Another way to reduce the resistance of the picture element electrode is the use of a metallic coating deposited thereon.

BRIEF DESCRIPTION OF THE DRAWINGS

FIG. 1 is a schematic diagram of a double electrode structure of a liquid crystal display;

FIG. 2 is a schematic diagram of a two layer structure of a liquid crystal display;

FIG. 3(A) is a schematic diagram of a combination of electrode structures;

FIG. 3(B) is an enlarged diagram of a picture element shown in FIG. 3(A);

DETAIL DESCRIPTION OF THE INVENTION

Figure 4A:
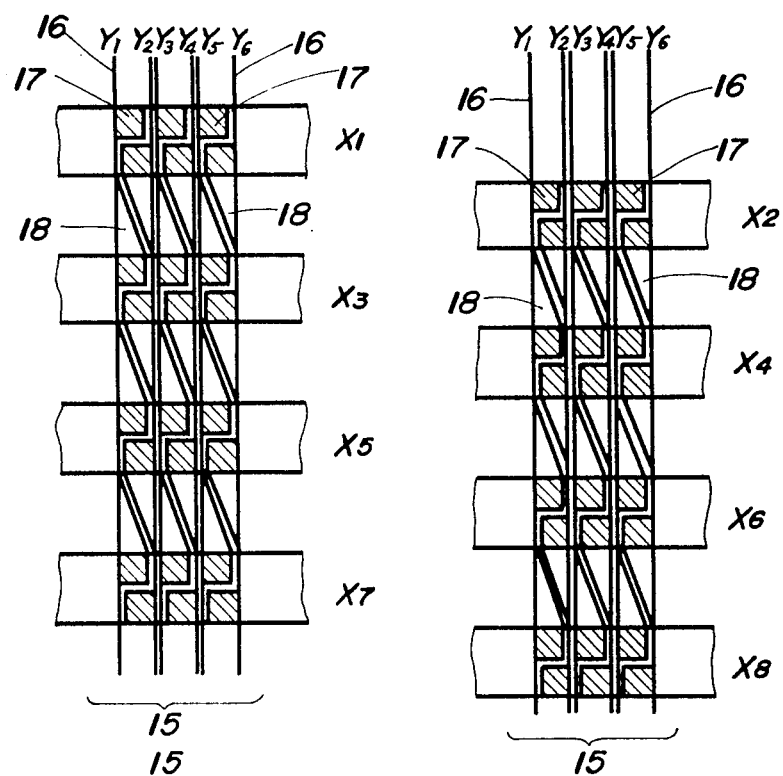
FIG. 4(A) is a schematic diagram showing an electrode structure of a liquid crystal display in one preferred embodiment of the present invention.
Figure 4B:
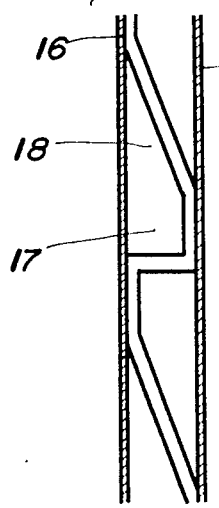
FIG. 4(B) is an enlarged diagram of the picture element electrode shown in FIG. 4(A)

Referring now to FIGS. 4(A) and 4(B), there is illustrated one preferred form of the present invention.

A picture element electrode 15 comprises a wiring electrode 16, a square electrode 17 corresponding to a very small area of a picture element and an extension electrode 18 which plays an important role in the present invention. The square electrode 17 is kept in contact with the wiring electrode 16 at its one edge like FIG. 1. The extension electrode 18 occupies a right-angled triangle defined by the wiring electrode 16 and the one edge of the square electrode 17, virtually lengthening the electrode width of the wiring electrode 16. The square electrodes are spaced in sequence in and alternatively in contact with the left hand wiring electrodes 16 and the right hand wiring electrodes 16, while the extension electrodes 18 are arranged similarly in contact with the left hand and right hand wiring electrodes alternatively. The extension electrodes 18 are not located on the picture element areas, thereby preventing the impairment of display performance.

Like FIG. 3(A) a first layer cell 19 displays a pattern by combinations of the picture element electrodes $Y_1$, $Y_2$, ... $Y_6$ and the strip electrodes $X_1$, $X_3$, $X_5$, $X_7$ and a second layer cell 20 by combinations of the picture element electrodes $Y_1$, $Y_2$, ... $Y_6$ and the strip electrodes $X_2$, $X_4$, $X_6$, $X_8$. The strip electrodes $X_1$, $X_2$, ... $X_8$ are in the same configuration as FIGS. 1 and 3(A). Of course, a liquid crystal material is injected between these two electrodes.

Figure 5A:
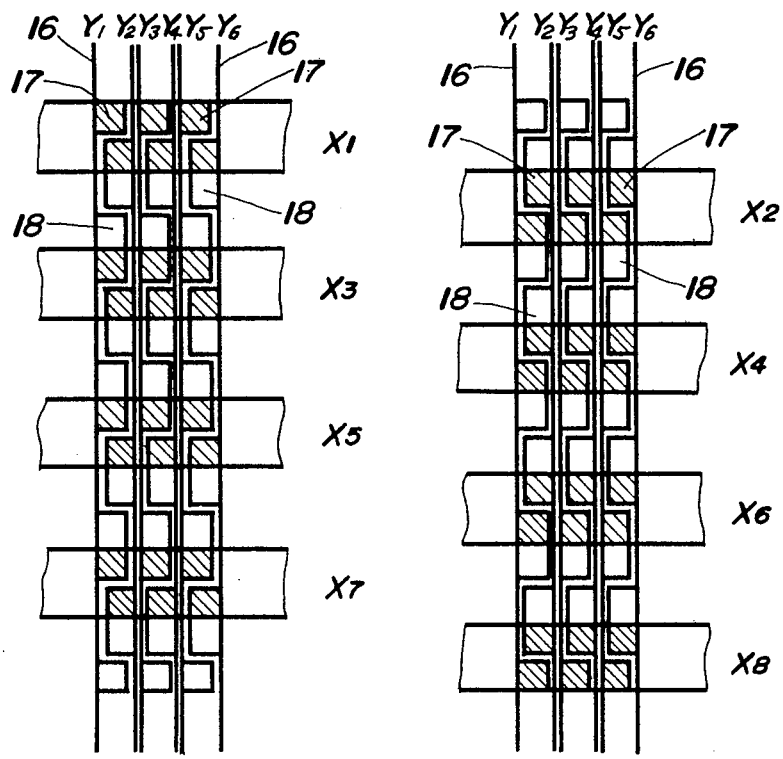
FIG. 5(A) is a schematic diagram of another preferred embodiment of the present invention.
Figure 5B:
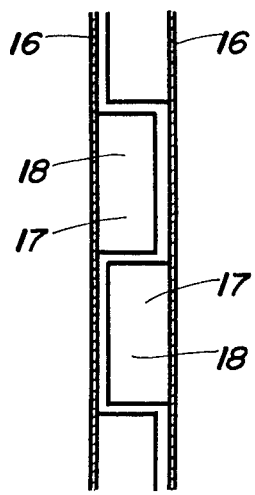
FIG. 5(B) is a partly enlarged diagram of the picture element electrode shown in FIG. 5(A).

FIGS. 5(A) and 5(B) show another preferred form of the present invention wherein the extension electrode is rectangularly shaped to achieve the electrode width lengthening effects in areas which are not picture element areas.

Although in the above illustrated embodiments an area of an electrode portion in a non-picture element area is expanded, this purpose of the present invention may be accomplished by provision of a metallic coating which crawls along the picture element electrode. The strip electrodes may be divided into a plurality of groups to make up a multi-layer structure other than the two-layered structure.

As stated above, the present invention enables a considerable reduction of the resistance of the picture element electrodes by lengthening the electrode width thereof in areas not occupied by picture elements, guaranteeing application of a desired and sufficient voltage thereto with no or minimal voltage drop.

In application of the present invention to the two-layered structure cell, it is advantageous in that a single photomask may be commonly used to the picture element electrodes of the first and second layer cells. Generally speaking, because of the nature of the double electrode structure, a somewhat fine and expensive pattern is required during the fabrication of the picture element electrodes. According to the present invention, the picture element electrodes are not different in pattern from the first layer cell to the second layer cell.

The invention being thus described, it will be obvious that the same may be varied in many ways. Such modifications are not to be regarded as a departure from the spirit and scope of the invention, and all such modifications are intended to be included within the scope of the following claims.

We claim:

1. An electrode structure for a matrix-type liquid crystal display including a first group of spaced parallel electrodes disposed in a first plane, a second group of spaced parallel electrodes disposed in a second plane and orthogonally crossing said first group of electrodes, said first and second groups of electrodes being disposed opposite each other and spaced with liquid crystal material interposed therebetween, each electrode of said first group of electrodes comprising:

a wire extending transversely to said second group of electrodes, said wire defining a continuous, electrically-conductive path of a predetermined width in said first plane;

a first electrode portion disposed opposite to the electrodes in said second group connected to and extending from said wire in said first plane; and extension electrodes connected to and extending from said wire in said first plane in regions between said first electrode portions which are not opposite to an electrode in said second group, said extension electrodes defining an electrically-conductive path which is wider in said first plane than the conductive path defined by said wire.

2. An electrode structure for a matrix-type liquid crystal display including a first group of spaced parallel electrodes disposed in a first plane, a second group of spaced parallel electrodes disposed in a second plane and orthogonally crossing said first group of electrodes, said first and second groups of electrodes being disposed opposite to each other and said planes being spaced with liquid crystal material interposed therebetween, each electrode of said first group of electrodes comprising:

a wire extending transversely to said second group of electrodes, said wire defining a continuous, electrically-conductive path of a predetermined width in said first plane;

a first electrode portion disposed opposite to the electrodes in said second group connected to and extending from said wire in said first plane; and coating means on said wire in said first plane in regions between said first electrode portions which are not opposite to an electrode in said second group for reducing the resistance of said wire in said regions.

* * * * *

UNITED STATES PATENT AND TRADEMARK OFFICE
CERTIFICATE OF CORRECTION

PATENT NO. : 4,335,937
DATED : June 22, 1982
INVENTOR(S) : Takamatsu et al

It is certified that error appears in the above—identified patent and that said Letters Patent is hereby corrected as shown below:

On the title page
In the category "[30] Foreign Application Priority Data"

change "Nov. 11, 1977 [JP] Japan ...... 52-151132[U]" to

--Nov. 10, 1977 [JP] Japan ...... 52-151132[U]--

Signed and Sealed this

Twenty-first Day of September 1982

[SEAL]

Attest:

Attesting Officer

GERALD J. MOSSINGHOFF

Commissioner of Patents and Trademarks